United States Patent [19]
Tibbals, Jr.

[11] Patent Number: 4,563,915
[45] Date of Patent: Jan. 14, 1986

[54] WOBBLE TYPE AXIAL SPEED REDUCER APPARATUS

[75] Inventor: Edward C. Tibbals, Jr., High Point, N.C.

[73] Assignee: William R. Loeffler, Denver, Colo.

[21] Appl. No.: 509,999

[22] Filed: Jul. 1, 1983

[51] Int. Cl.[4] .............................................. F16H 13/08
[52] U.S. Cl. .......................................... 74/800; 74/60; 74/798
[58] Field of Search ................... 74/60, 797, 798, 800

[56] References Cited

U.S. PATENT DOCUMENTS

| | | | |
|---|---|---|---|
| 1,430,275 | 9/1922 | Almen | 74/60 |
| 2,119,955 | 7/1938 | Litton | 286/29 |
| 2,149,321 | 3/1939 | Taylor et al. | 74/60 |
| 2,211,741 | 8/1940 | Elwell | 74/56 |
| 2,545,562 | 3/1951 | Thiel, Jr. | 286/29 |
| 2,836,985 | 6/1958 | Maroth | 74/424.8 |
| 2,874,594 | 2/1959 | Sundt | 74/805 |
| 3,094,880 | 6/1963 | Maroth | 74/60 |
| 3,139,772 | 7/1964 | Maroth | 74/800 |
| 3,403,668 | 10/1968 | Schottler | 123/197 |
| 3,587,350 | 6/1971 | Wanlass | 74/800 |
| 3,590,659 | 7/1971 | Maroth | 74/800 |
| 3,678,807 | 7/1972 | Papst | 92/70 |
| 4,263,814 | 4/1981 | Takaoka | 74/60 |

FOREIGN PATENT DOCUMENTS

| | | | |
|---|---|---|---|
| 2119155 | 11/1971 | Fed. Rep. of Germany | 74/797 |
| 620214 | 5/1961 | Italy | 74/800 |

Primary Examiner—Leslie A. Braun
Assistant Examiner—Dwight G. Diehl
Attorney, Agent, or Firm—John E. Reilly

[57] ABSTRACT

A differential speed reducer has a wobble member mounted on an input shaft so as to follow a sinusoidal path of movement. A first gear journaled on the wobble member has a radially disposed cam surface on one face to follow the sinusoidal movement of the wobble member, and a second gear is axially spaced from the first gear with correspondingly formed cam surfaces aligned with those of the first gear, and a plurality of balls are interpositioned between the first and second cam surfaces to transmit torque from the rotary input shaft to the second cam surface. For multiple speed reduction, a second set of cam surfaces corresponding to the first cam surfaces is interposed between the input shaft and first set of cam surfaces, and rolling elements again impart torque from the input side into the first set of cam surfaces. The first and second sets of cam surfaces can be formed on different radii and concentrically positioned with respect to one another so as to form a very compact speed reducer unit.

23 Claims, 12 Drawing Figures

WOBBLE TYPE AXIAL SPEED REDUCER APPARATUS

Specification

This invention generally relates to new and useful improvements in speed reducers, and more particularly relates to a novel and improved speed reducer apparatus of the differential type which is characterized by its high efficiency and ease of fabrication while being extremely compact and capable of achieving high speed reduction ratios over a wide range.

BACKGROUND AND FIELD OF THE INVENTION

A number of differential gearing systems have been devised to achieve high speed reduction ratios where low speed high torque outputs are needed. Representative of such approaches are the "Rota-Mission" manufactured and sold by Plessey Dynamics of Union, N.J., and an epicyclic gear reducer manufactured and sold by Sumitomo Machinery Corp. of Osaka, Japan. A problem inherent in such mechanisms is that the intermeshing action from direct engagement of the gears tends to generate heat losses as a result of the sliding action of the gear teeth. In non-differential axial gear systems, this problem is avoided since the gear teeth which move at high speeds encounter relatively small forces, and the gear teeth on the output side of the reducer which encounter high forces will operate at low speeds. Other devices have been devised in an effort to overcome the problem of heat losses, such as, by the use of rolling elements between the interfacing gear teeth. Representative of this approach is U.S. Pat. No. 2,874,594 to E. V. Sundt. In Sundt, an eccentric is carried by a rotating shaft for rotation therewith and an oscillating member is rotatably mounted on the eccentric. The oscillating member is provided with a ring of teeth and a gear member is rotatably mounted concentrically with the shaft and provided with teeth in meshing relation with the ring of teeth on the oscillating member. A plurality of balls or rollers are movably carried by one of the members for movement along the teeth of that member and are interpositioned between the teeth and the teeth of the other member in order to rollingly transmit torque from the oscillating member to the gear member. Multiple speed reduction can also be achieved by controlling the rotation of the oscillating member with respect to the eccentric by another ring of teeth on the oscillating member which meshes with teeth on another gear. Again, rolling elements are interposed between the second set of teeth so as to control the rotation of the oscillating member with respect to the eccentric. However, the use of an eccentric member makes such systems difficult to balance, particularly at high speeds; and the concentricity between the gear surfaces imposes definite limitations with respect to size and efficiency.

Wobble plates have been employed for numerous motion-transmitting applications. For instance, by positioning the wobble plate on a rotating shaft, its axial or wobbling movement can be transmitted to impart that movement to reciprocate a piston in a cylinder or otherwise convert the rotary motion of the shaft into some form of linear or axial motion. In U.S. Pat. No. 2,836,985 to A. M. Maroth, a series of balls are sandwiched between a pair of cam plates for the purpose of converting rotary motion of a nut into linear motion of a screw, the intended function being to cause the cam plates to be moved in an axial direction as the balls successively advance between the crests and troughs along the wavy surface of the cam plate. A more recent patent to Maroth, U.S. Pat. No. 3,094,880, establishes speed reduction by axial movement imparted to a wobble plate by rolling movement of balls between the corresponding number of crests and valleys which axial movement is then converted by a wobble plate into rotational movement of a cam fixed on the output shaft of the assembly. Neither of the Maroth patents establishes speed reduction by selectively varying the relative number of gear teeth on a wobble plate with respect to another gear in achieving a predetermined speed reduction or torque output.

SUMMARY OF THE INVENTION

It is therefore an object of the present invention to provide for a novel and improved wobble plate speed reducer assembly characterized by its high efficiency and correspondingly low energy losses and which is extremely compact and constructed of a minimum number of parts while being capable of achieving speed reduction ratios over a wide range between the input and output shafts.

It is another object of the present invention to provide for a novel and improved wobble plate speed reducer which is capable of minimizing heat and friction losses between meshing gear surfaces and wherein one or more sets of confronting gear surfaces may be employed in combination to achieve single or multiple speed reduction in an extremely compact unit.

It is a further object of the present invention to provide for a novel and improved wobble plate speed reducer assembly in which the wobble plate is characterized by its simplicity of construction, lightness in weight, ease and simplicity of fabrication of the main speed reduction-controlling gear surfaces thereon to achieve predetermined reductions in speed ratio between input and output shafts.

It is an additional object of the present invention to avoid fabrication difficulties associated with producing internal trochoidal contoured rings and further to avoid use of an eccentrically orbiting element and the balancing problems associated therewith.

In accordance with the present invention, there has been devised a novel and improved differential speed reducer which is broadly comprised of a rotary input shaft having a wobble member mounted in canted relation to the shaft so as to circumscribe a sinusoidal path of movement. A first gear member is journaled on the wobble member having a radially disposed cam surface at least on one face thereof to follow the sinusoidal path of movement of the wobble member, the cam surface having uniformly spaced, axially directed crests and valleys of convoluted form. A second gear member mounted in axially spaced relation to the first gear member is provided with uniformly spaced, axially directed sinusoidal crests and valleys differing in number from and disposed in spaced relation to the crests and valleys of the first cam surface, and a plurality of rolling members are interpositioned between the first and second cam surfaces for transmitting torque from the rotary input shaft to the second cam surface, the speed ratio between the input shaft and second cam surface being a function of the relative number of crests and valleys, or pitch, between said first and second surfaces.

Multiple speed reduction can be achieved through a second set of cam surfaces corresponding to the first and second cam surfaces, the second set of cam surfaces disposed in facing relation to one another between a fixed support plate and one side of the first gear member opposite to the first cam surface. Rolling members between the second set of cam surfaces impart torque from the input side into the first set of cam surfaces. Again, the speed reduction ratio will be determined by the relative pitch of the second set of cam surfaces together with the first set of gear or cam surfaces so as to be either additive or subtractive. When first and second sets of cam surfaces are employed, a cam surface for each set may be simultaneously formed on opposite sides of the wobble plate by pressing convolutions into the surface of a thin, flat outer ring making up a portion of the wobble plate. Moreover, one set of cam surfaces can be formed on a different radius than the other set and concentrically positioned one within the other.

The above and other objects, advantages and features of the present invention will become more readily appreciated and understood when taken together with the following detailed description of alternate embodiments of the present invention in conjunction with the accompanying drawings, in which:

DETAILED DESCRIPTION OF A FIRST EMBODIMENT

Referring in more detail to the drawings, there is illustrated in FIGS. 1 to 9 one preferred form of wobble plate speed reducer having a rotary input shaft 10 and an output shaft 12 in axially aligned relation to one another; and an outer stationary housing 14 encloses a fixed support plate or stationary ring 15, wobble plate assembly 16 and an output ring 17, the ring 17 being journaled with respect to the housing 14 and connected into the output shaft 12 to impart rotation thereto.

Figure 1:
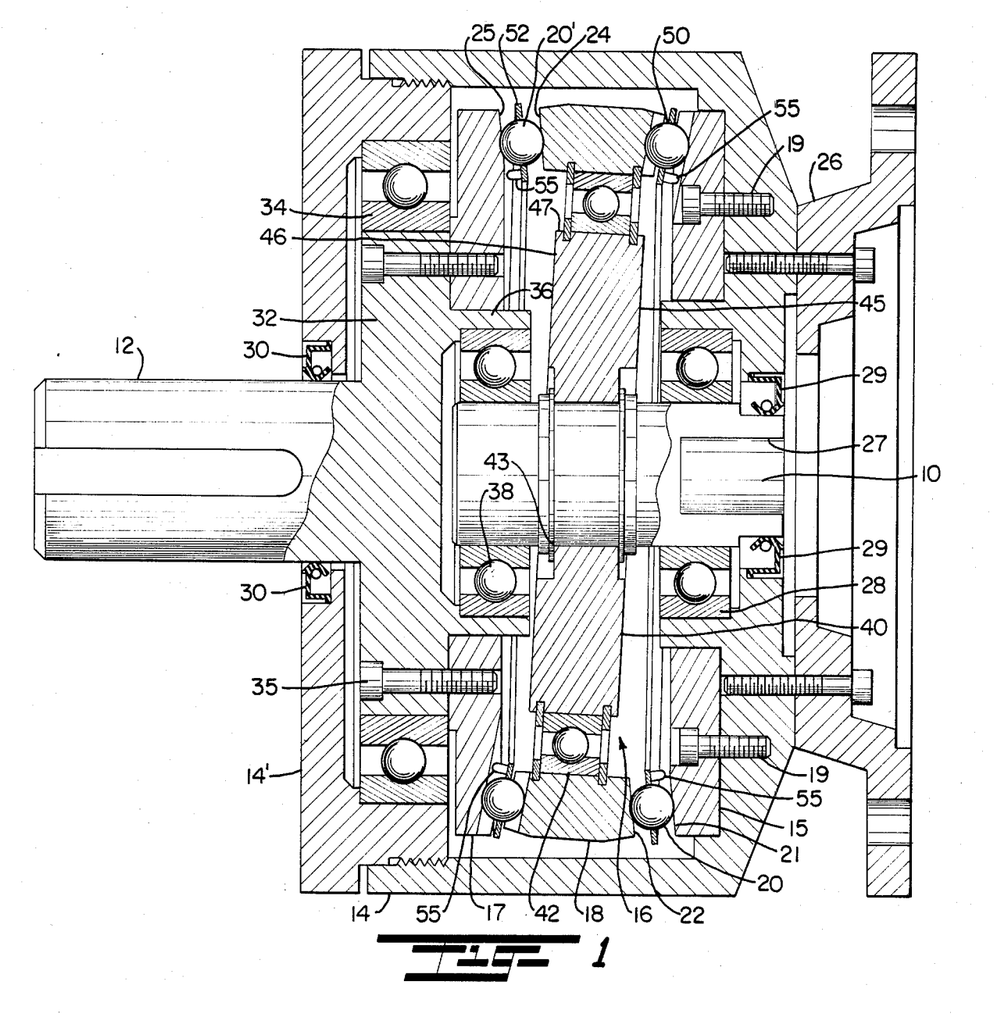
FIG. 1 is a vertical section view taken through the axis of a preferred form of wobble plate speed reducer in accordance with the present invention.
Figure 2:
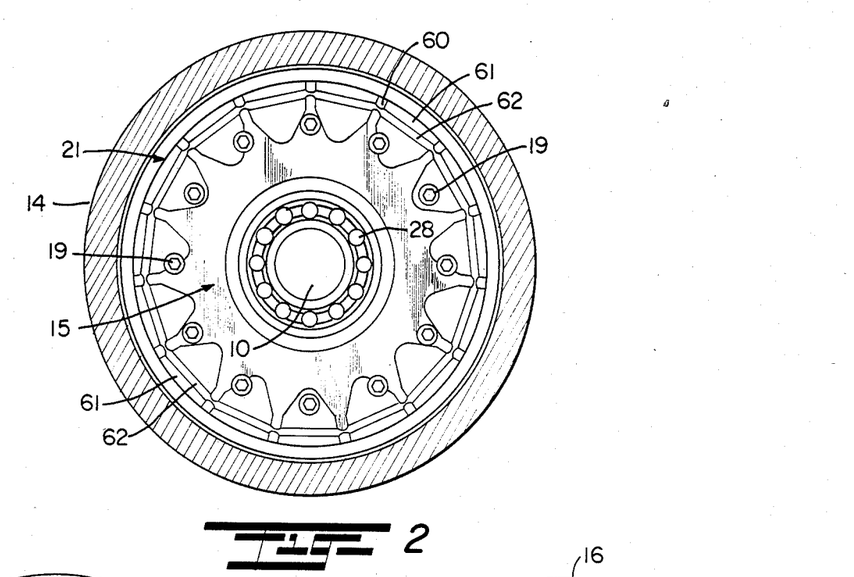
FIG. 2 is a cross-sectional view taken at the input side of the reducer shown in FIG. 1.
Figure 3:
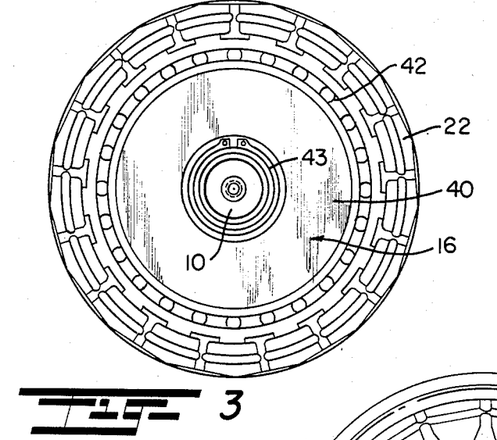
FIG. 3 is a cross-sectional view taken at the input side of the wobble plate of FIG. 1.
Figure 4:
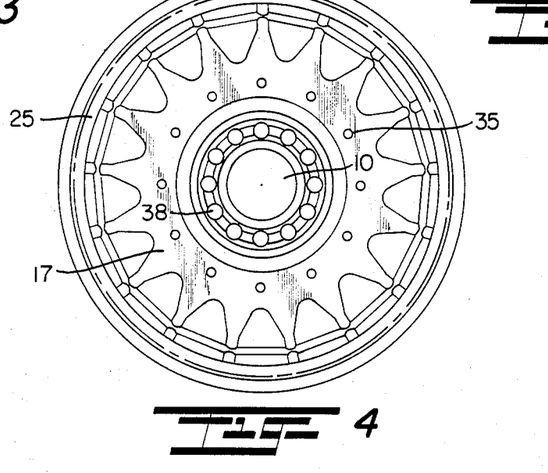
FIG. 4 is a cross-sectional view taken at the output side of the wobble plate of FIG. 1.
Figure 5:
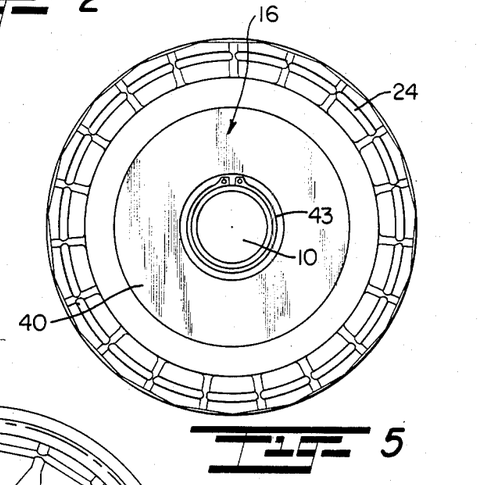
FIG. 5 is a cross-sectional view taken at the output ring of the reducer shown in FIG. 1.
Figure 6:
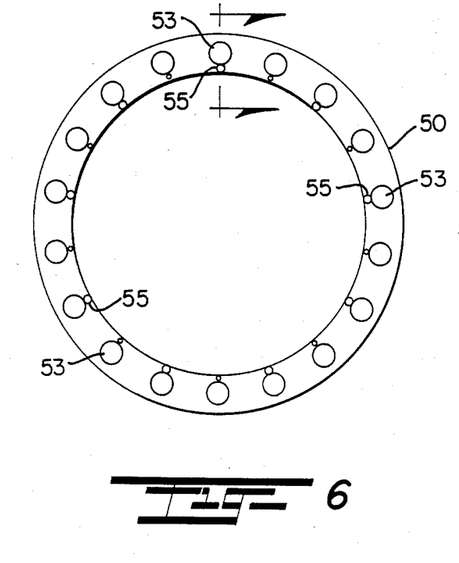
FIG. 6 is a front view in elevation illustrating a preferred form of retainer ring for the rolling elements on the input side of the speed reducer.
Figure 7:
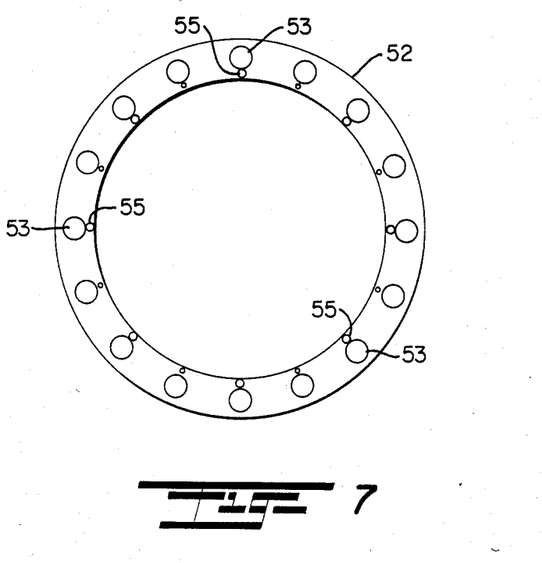
FIG. 7 is a front view in elevation of the retainer ring for the rolling elements on the output side of the speed reducer shown in FIG. 1.

Broadly, the stationary ring 15 is affixed by fasteners 19 to one end of the housing so as to be fixed against rotation and is sloped at an angle with respect to a plane normal to the rotation of the shaft 10. The input shaft 10 may be keyed to the shaft of a conventional drive motor, not shown, and imparts its rotation into an inner supporting ring 40 of the wobble plate assembly 16. An outer wobble ring 18 is journaled on the ring 40 and is canted with respect to the rotational axis of the input shaft 10 so as to precess about the fixed stationary ring 15 in response to rolling engagement of rolling elements in the form of circumferentially spaced balls 20 between cam surfaces 21 and 22 on confronting surfaces of the stationary ring 15 and wobble ring 18, respectively. Another set of balls 20' is sandwiched between cam surfaces 24 and 25 which are located between confronting faces of the wobble ring 18 and output ring 17 so as to cause the output ring 17 to precess with respect to the wobble ring 18.

As a preliminary to discussing the features and characteristics of the preferred embodiment of the present invention, brief reference will be made to conventional parts of the preferred embodiment shown in FIG. 1 including an input flange 26 which is shown affixed to one end wall of the housing and serves as a suitable means of mounting of a motor drive such that the output shaft on the motor is extended for driving connection into the center recessed portion 27 of the input shaft 10. Suitable bearings in the form of ball bearings 28 are interposed between the external surface of the input shaft 10 and end wall of the housing with seals 29 disposed around the shaft of the bearings 28. Another set of external seals 30 is disposed between the output shaft 12 and the end wall 14' of the housing 14, the output shaft having an enlarged flange 32 located internally of the housing and journaled with respect to the housing by ball bearings 34. The output ring 17 is affixed by suitable fasteners 35 to the enlarged flange 32, and an annular extension 36 is journaled by ball bearing 38 in outer spaced concentric relation to the inner end of the input shaft 10.

In the mounting and assembly of the wobble plate assembly 16, the outer wobble ring 18 is journaled on inner concentric supporting ring 40 by ball bearings 42, the inner support ring 40 being fixed for rotation with the shaft 10 and supported on the shaft by retainer rings 43. It will be noted that the support ring 40 has opposite wall surfaces 45 and 46 which are canted somewhat or inclined with respect to a plane normal to the axis of rotation of the input shaft and terminate in an outer circumferential end wall surface 47 upon which the wobbler ring 18 is mounted whereby to establish the angularity of the wobble ring 18 with respect to the input shaft. The gear or cam surface 21 on the support ring 15 is similarly sloped with respect to the axis of the input shaft to correspond to the angularity given to the wobble plate assembly. Each series of rolling elements or balls 20 and 20', respectively, are retained between their respective gear or cam surfaces by retainer rings 50 and 52 as shown in more detail in FIGS. 5 to 7. Each retainer ring consists of a thin annular web member which is inclined or cocked at an angle corresponding to the angularity between the confronting gear surfaces as established by the slope between the wobble plate assembly and respective input and output support rings 15 and 17. A series of circular openings 53 are disposed at equally spaced circumferential intervals through the thickness of the ring, the number of openings or apertures 53 corresponding to the number of balls and being slightly enlarged with respect to the balls. Centering pins 55 are disposed at intervals around opposed surfaces of the ring to maintain its spacing with respect to the confronting gear surfaces.

FIGS. 2 through 5 are cross-sectional views taken through FIG. 1 to illustrate frontally and in succession the stationary ring 15 and its gear surface 21, wobble plate assembly 16 and its oppositely directed cam surfaces 22 and 24, and the rotary support ring 17 and its cam surface 25. In the preferred form, each of the cam surfaces 21, 22, 24, 25 is of a generally convoluted configuration so as to define axially directed cam elements or lobes with rounded convex crests 60 joined by generally concave or rounded valleys 61 symmetrically around the outer peripheral surface on their respective input ring 15, wobble plate ring 16 and output ring 17.

The crest 60 of each lobe tapers outwardly in a radial direction from the axis of rotation of the input and output shafts and is concentrically located about the axis of rotation. Moreover, each cam surface is formed with a circumferentially extending groove 62 which groove is aligned with the ball-retaining apertures 53 in the retaining rings 50 and 52 so as to aid in maintaining proper tracking of the balls 20 in their advancement along the cam surfaces in a manner to be described. The desired speed reduction ratio and torque output for a given sized speed reducer will be determined basically by the relative pitch or number of crests or lobes on each gear surface. Considering only the output gear surface 24 of the wobble plate ring in relation to the gear surface 25 of the output ring 17, and by way of illustration, if the cam surface 24 is given a pitch of 19 and the cam surface 25 is given a pitch of 17 with the number of balls between the cam surfaces 24 and 25 being selected at 18, the speed reduction ratio will be established as $$\frac{1}{\frac{2}{19}} = 9.5:1$$

This relationship presupposes that the wobble ring 18 is free to precess and follow a generally sinusoidal path of movement but is not keyed for rotation with the input shaft. In this relation, the wobble ring 18 will advance two lobes faster than that of the output ring 17, and each ball 20 will undergo two revolutions in its rolling path of advancement between the wobble ring 18 and the output ring 17. In that the number of lobes or crests on the wobble ring 18 is two greater than that of the output ring 17, the effect will be to cause the output shaft to undergo reverse rotation with respect to the input shaft and at a speed reduction ratio of 9.5:1; and the amount of torque delivered is a result of the tangential force applied by the rolling elements or balls 20 against the sloping surfaces of the gear teeth coupled with the precession of the wobble ring with respect to the input shaft.

The speed reduction ratio can be multiplied by employing the second set of cam surfaces as defined by the cam surface 21 on the input ring 15 and the cam surface 22 on the wobble ring 16. For instance, by selecting the relative number of teeth or lobes for the cam surfaces 21 and 22 to be 15 and 17, respectively, the speed reduction ratio established therebetween is $$\frac{1}{\frac{2}{17}} = 8.5:1$$

In this relationship, the input ring has two less than the number of lobes on the wobble gear surface 22; therefore, for each revolution of the input ring, the wobble ring will advance two lobes faster or 2/17th of a revolution faster. The total speed reduction ratio is then determined by the following:

$$\left(1 - \frac{2}{17}\right)\left(\frac{1}{\frac{2}{17} - \frac{2}{19}}\right) = 71.25:1$$

Figure 9:
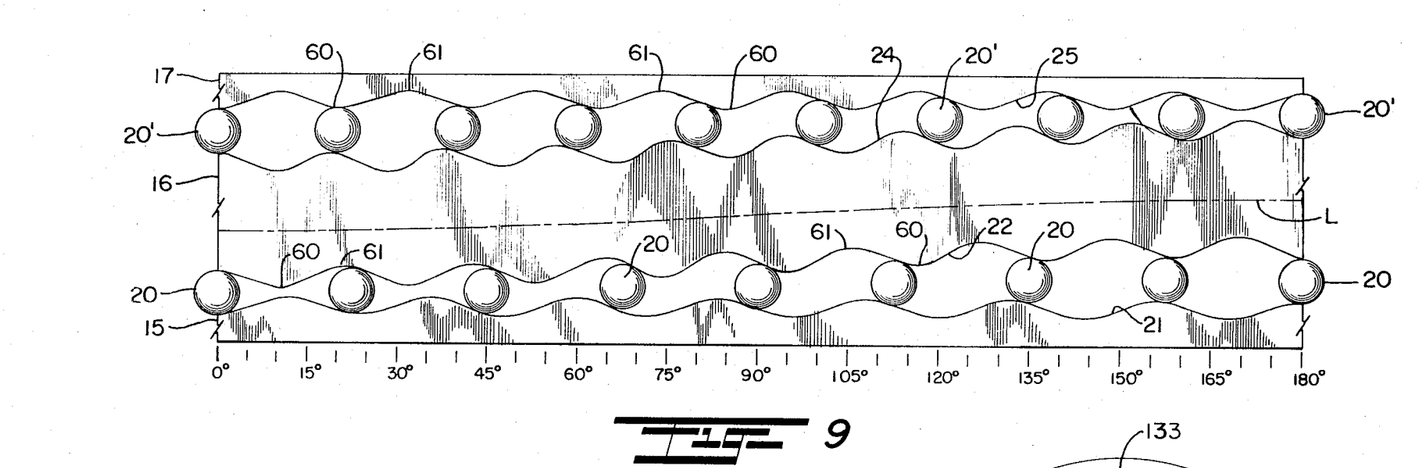
FIG. 9 is a a layout view of the gear or cam surfaces on input and output sides of the wobble plate assembly and illustrating the relative movement therebetween.

FIG. 9 illustrates the relative advancement of the balls between or along opposite sides of the wobble ring and between the input and output rings over 180° or one-half revolution. The center line represented at L illustrates the precession or path of movement of the wobble ring which, as it undergoes rotation in response to the torque imparted by the rolling advancement of the balls, will follow a generally sinusoidal curve. Specifically, FIG. 9 illustrates the advancement of a single ball along each of the tracks formed on opposite sides of the wobbler ring as well as the relative advancement of the lobes over one-half revolution. The minimum clearance required between gear or cam surfaces which will occur when a crest of one lobe is aligned with a crest of a confronting lobe on the next track is only that necessary for interpositioning of the retaining ring therebetween. Absent the retaining ring essentially no clearance would be required, since as the wobble ring undergoes precession with respect to the sloped faces of the input and output rings 15 and 17 the cam surfaces on the wobble ring will diverge or gradually advance in an axial direction away from the confronting cam surfaces for a distance equal to the ball diameter, for example, as illustrated in their progressive advance from 0° to 180° in FIG. 9. As the ball advances along the sloped surfaces of each gear, it will impart a tangentially directed or rotational force, for example, between the input ring cam surface 21 and wobble ring cam surface 22 which becomes most evident in viewing the relationship between the ball and cam surfaces from 25° to 135° in FIG. 9. As the ball approaches the crest of each lobe at the 135° point, it will impart little or no rotational force to the cam surface 22 and will continue to impart little or no force as it rolls over the crest and along the back face of the crest into the next root. Thus, at any given point in time, it will be recognized that the rotational force will be imparted between the cam surfaces only through those balls which are rising along the front slope in approaching each crest or lobe. For this reason, the crests of the cam surfaces may be truncated or slightly flattened to reduce the spacing between the gear members without sacrificing the rotational force imparted by the balls.

As related earlier, the wobble ring will undergo revolutions at a rate corresponding to the greater number of lobes on the wobble ring with respect to the output ring. However, the relative pitch of the input cam surfaces 21 and 22 with respect to the output cam surfaces 24 and 25 is such that the output shaft is rotated in the same direction as the input shaft. It will be appreciated that the direction of rotation of the output ring may be reversed so as to be in the opposite direction to that of the input ring by reversing the relative number of lobes so that the output cam surfaces 24 and 25 would have a pitch of 17 and 15, respectively, and the input cam surfaces 21 and 22 a pitch of 19 and 17, respectively. In this way, the rotational force or torque would be applied in the reverse direction to the direction of rotation of the input ring.

In FIGS. 1 to 9, there are two lobes difference between the input and output cam surfaces 21 and 22, and the number of balls is one greater than the lower number of lobes and one less than the greater number in establishing optimum clearance and transmission of torque between the confronting cam surfaces. The same is true of the output cam surfaces 24 and 25. Thus, where the input cam surface 21 has 15 lobes and the wobble ring cam surface 22 has 17 lobes, the optimum number of balls between the confronting cam surfaces would be 16; and, where the output cam surface 24 has 19 lobes compared to 17 lobes on the output ring surface 25, the optimum number of balls would be 18.

The foregoing is given by way of illustration and not limitation in establishing a speed reducer having maximum efficiency for given size and space requirements. Further, it has been found that in establishing a pitch difference of two or, in other words, two more or less lobes or crests between the input ring and wobble ring as well as between the wobble ring and output ring, optimum relationships can be established in the movement of the balls between the confronting cam surfaces. Essentially, the cam surfaces in following the precession of the wobble ring will circumscribe a sinusoidal path of movement, and the centers of the balls will correspondingly define a sinusoidal path of movement. This assumes some importance in the respect that the point contacts between each ball and opposing gear surfaces are maintained 180° apart and no sliding occurs. Moreover, the balls are selected to be of a size and number so as not to contact one another but are free to roll independently under the control of the relative movement of the cam surfaces.

As a general proposition, as the balls undergo a rolling path of movement sinusoidally along the cam surfaces they will nevertheless remain a fixed distance from the center point of rotation of the wobble plate; i.e., will advance along the surface of an imaginary sphere whose radius equals the distance between the center of each ball and the center point of oscillation of the wobble plate.

ALTERNATE EMBODIMENTS OF THE PRESENT INVENTION

Figures 8, 10:
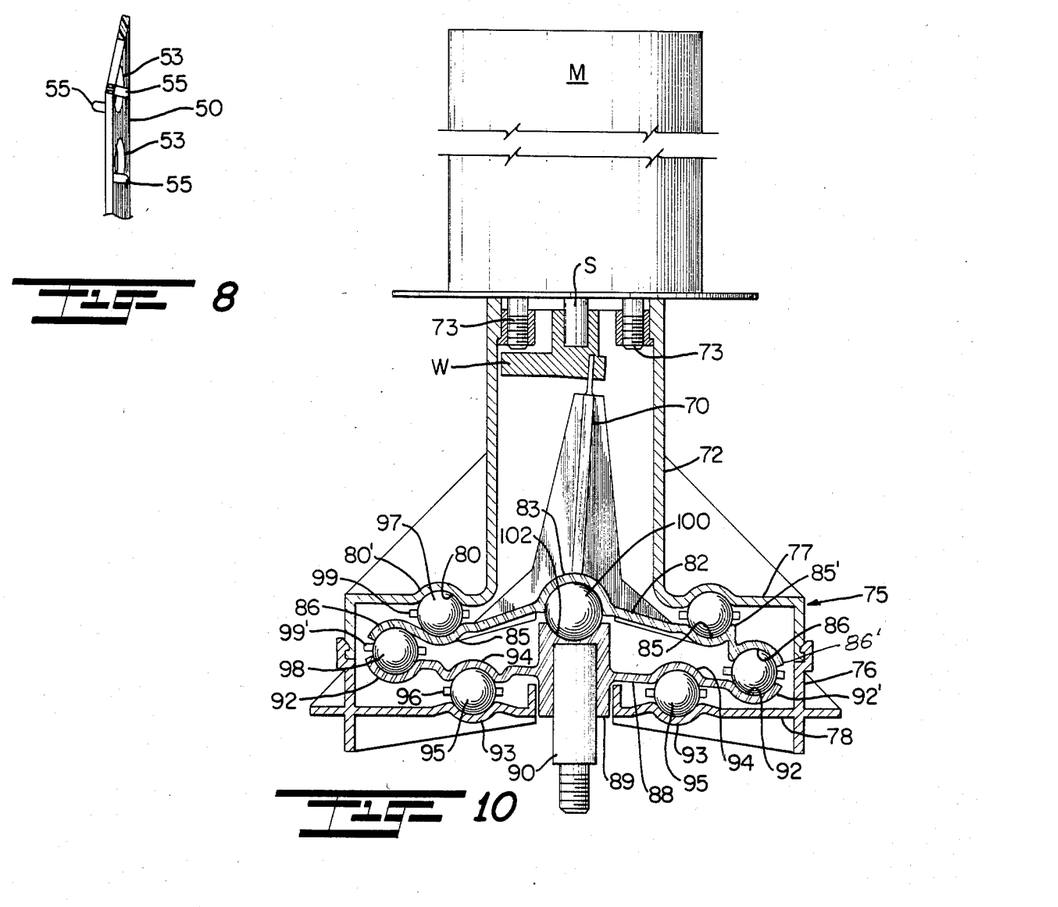
FIG. 8 is a cross-sectional view enlarged of a portion of one of the retaining rings shown in FIGS. 6 and 7.
FIG. 10 is a view partially in section of a modified form of speed reducer in accordance with the present invention.

A modified form of invention is illustrated in FIG. 10 which illustrates the relative simplicity of construction of a speed reducer in accordance with the present invention as well as the ability to position different sets of cam surfaces and rolling elements for rolling advancement between those cam surfaces along different spheres substantially within one another. In this form, a motor drive M has an output shaft S keyed for rotation of a crank W with a wobble mast extension 70 eccentrically mounted in the crank W with respect to the axis of rotation of the shaft S. The wobble mast extension 70 is enclosed within a tubular housing 72 which is fixed at one end by suitable fasteners 73 to the motor housing and at the opposite end terminates in a larger diameter casing 75. Casing 75 is comprised of a generally cylindrical outside wall 76 and opposite annular end walls 77 and 78. The end wall 77 verges in a radially outward direction from the end of the tubular housing 72 and is sloped or canted at an acute angle to a plane normal to the axis of rotation of the shaft S. A cam surface 80 defined by a series of crests and roots of convoluted configuration, as described with reference to the preferred form of invention, is formed out of the end wall by a suitable molding or stamping operation.

A wobble plate 82 is disposed in closely-spaced relation to the end wall 77 and has a semispherical cup 83 which is centered at the end of the mast 70, and inner and outer concentric cam surfaces 85 and 86 are formed out of the thickness of the wobble plate, the inner cam surface 85 being aligned with the cam surface 80 on the end wall 77. The outer concentric cam surface 86 has its cam elements, or crests and valleys, facing in a direction opposite to that of the inner concentric cam surface 85.

A rotary output plate 88 is mounted on a hub 89 into which is inserted output shaft 90 so as to be keyed for rotation with the output plate 88. The output plate 88 has a cam surface 92 formed in a manner corresponding to that described with reference to cam surfaces 80, 85 and 86 with the cam surface 92 aligned with the outer concentric cam surface 86 of the wobble plate.

The end wall 78 and support plate 88 are provided with races 93 and 94, respectively, to accommodate ball bearings 95 and retainer 96 so that the support plate is journaled with respect to the end wall of the housing. Thrust imparting rolling elements in the form of balls 97 are positioned in circumferentially spaced relation between the cam surfaces 80 and 85, and a second set of balls 98 is positioned in circumferentially spaced relation between the cam surfaces 86 and 92.

In a typical relationship which may be established for a given desired speed reduction ratio, the cam surface 80 may be formed with an 8-lobe fixed race, and the cam surface 85 formed with a 10-lobe race with nine balls 97 interposed therebetween. A retaining ring 99 corresponding to that employed in the preferred form retains equal circumferential spacing between the balls 97.

The opposite surface 86 may be given an 11-lobe race while the cam surface 92 is given a 9-lobe race with a series of ten balls 98 interposed therebetween and retained in desired relation by a second retaining ring 99'. The wobble plate 82 is mounted as shown on ball bearing 100 which is positioned between the semi-spherical cup 83 and a shallow recess 102 at the end of the hub 89 so that the wobble plate is free to precess at an angle corresponding to the slope of the annular end wall 77. Correspondingly, the output plate 88 is sloped at an angle such that its cam surface 92 will precess at an angle corresponding to that of the cam surface 86.

In use, as the drive shaft S is rotated, it will impart eccentric motion to the end of the mast extension 70 causing the connected wobble plate member 82 to undergo precessional movement such that the cam surface 85 will advance along a generally sinusoidal path toward and away from cam surface 80 on the end wall 77 as it turns about the center ball bearing 100. Similarly, the outer cam surface 86 will undergo precessional movement along a generally sinusoidal path as described in relation to the first embodiment and advance toward and away from the cam surface 92 on the rotary support ring 88. By virtue of the speed reduction ratio established between the first and second sets of cam surfaces, torque is imparted via the wobble plate 82 into the output ring 88 to cause the output shaft 90 to rotate with the output ring. The rolling elements or balls 97 will undergo rolling advancement between the end wall 77 and cam surface 85 while the centers of the balls are constrained to move along the surface of an imaginary sphere whose center is at the center of rotation of the wobble plate 82. The balls 98 will undergo rolling advancement along a generally sinusoidal path while remaining on the surface of another imaginary sphere having a diameter greater than that of the balls 97 and whose center is the center of rotation of the wobble plate 82.

The formation of the cam surfaces 80, 85, 86 and 92 is modified somewhat with respect to that of FIGS. 1 to 9 by curving or rounding the outer radial ends of confronting valleys toward one another, as designated at 80', 85', 86' and 92', and in a manner corresponding to that hereinafter described and shown in the modified form of FIGS. 11 and 12. In this way, the rolling elements 97 and 98 are retained against outward movement away from their centers of rotation.

Figure 11:
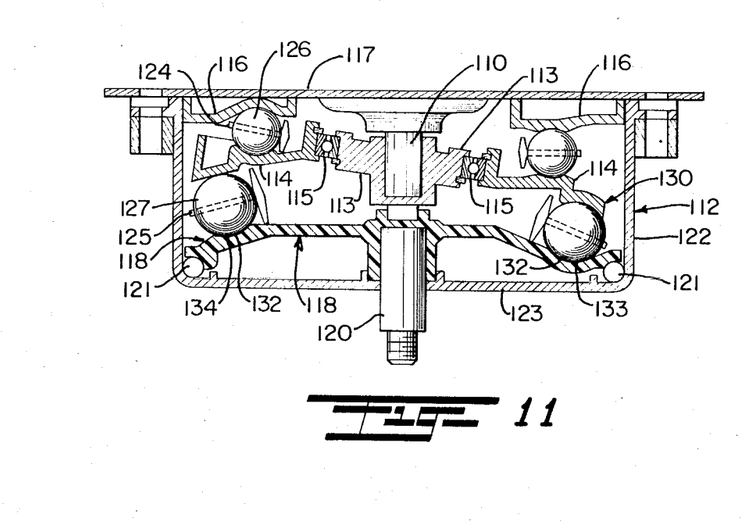
FIG. 11 is a view partially in section of another modified form of speed reducer in accordance with the present invention.
Figure 12:
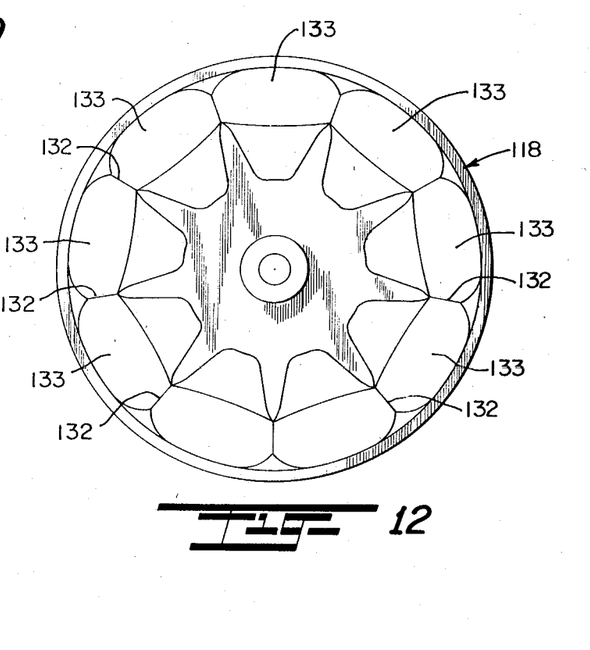
FIG. 12 is a view in elevation of the output plate forming a part of the modified form of invention shown in FIG. 11.

FIGS. 11 and 12 illustrate another form of invention in which an input shaft 110 is journaled in housing 112, and a wobble member 113 supports a wobble ring 114 on bearings 115 whereby the wobble ring 114 is free to undergo precessional movement in response to rotation of the wobble member 113 with the input shaft 110 in the same manner as described with reference to FIGS. 1 to 9. A fixed input ring 116 is affixed to an end wall 117 of the housing 112, and a circular output plate 118 is keyed to output shaft 120. Ball bearings 121 are positioned between the outer periphery of plate 118 and an outside corner of the housing between the sidewall 122 and outer end wall 123. Retainer rings 124, 125 operate in the same manner as retaining rings 50 and 52 of FIGS. 1 to 9 to maintain the rolling elements 126 and 127 in equally spaced circumferential relation to one another between confronting cam surfaces of the input ring 116 and wobble ring 114 at the input side and the wobble ring 114 and output plate 118 on the output side of the speed reducer, respectively.

FIG. 12 is a front view of the output plate 118, and serves to illustrate the circumferential disposition and relationship between the cam surfaces on the output plate 118 as well as the wobble ring 114 and input ring 116. Accordingly, like portions of the cam surfaces on each member are correspondingly enumerated. Referring to FIG. 12, each cam surface as generally designated at 130 is correspondingly formed with alternating crests 132 and valleys 133 extending in a circumferential direction about its respective member. Each valley is of generally cup-shaped or concave configuration in a radial direction away from the common center line or axis of rotation of the input and output shafts. The crests 132 extend essentially along a straight line in a radial direction away from the common center line but are interrupted by shallow depressions or grooves 134 which in cooperation with the valleys 133 retain the balls 126 and 127 against outward radial movement. In other words, the balls are constrained to follow the same sinusoidal path of movement along the surface of an imaginary sphere as described with reference to the embodiments of FIGS. 1 to 9 and FIG. 10. In a circumferential direction, again each of the cam surfaces 130 is defined by lobes or rounded crests 132 joined by generally concave or rounded valleys 133 symmetrically around the peripheral surface of the respective members so that if laid out in a manner corresponding to the developmental view of FIG. 9 would once again be of generally sinusoidal or convoluted configuration in a circumferential direction. One distinction from the cam surfaces of FIGS. 1 to 9 is that the cam surfaces 130 are grooved only across the crest portions to maintain proper tracking of the balls and, as the ball traverses each valley, will be retained by the curved or generally cup-shaped outer radial ends of the valleys to maintain proper tracking. The same is true with respect to the cam surfaces 80, 85, 86 and 92 of the form of invention illustrated in FIG. 10.

In the modified forms of invention shown in FIGS. 10 to 12, inclusive, again the cam surfaces on the wobble ring will undergo a sinusoidal path of movement, and the balls or rolling elements will advance sinusoidally along the cam surfaces while remaining a fixed difference from the center point of turning or precession of the inner wobble member so as to advance along the surface of an imaginary sphere whose radius equals the distance between the center of each ball and the center point of oscillation of the wobble member. Thus in the same manner as described with reference to FIGS. 1 to 9, the point contacts between each ball and opposing cam surfaces are maintained 180° apart so as to avoid relative sliding action between the balls and the cam surfaces.

It is therefore to be understood that various modifications and changes may be made in the various forms of invention as set forth herein without departing from the spirit and scope of the present invention as defined by the appended claims.

I claim:

1. A speed reducer assembly comprising:
   a rotatable input shaft having drive means therefor;
   a first gear member journaled for independent rotation with respect to said input shaft and mounted in canted relation thereto whereby to circumscribe a sinusoidal path of movement, said first gear member being driven by said input shaft, said first gear member including axially directed gear portions on one face thereof having uniformly spaced, axially directed crests and valleys;
   a second gear member mounted in axially spaced relation to said first gear member and provided with gear portions having uniformly spaced, axially directed crests and valleys differing in number from and disposed in spaced relation to the crests and valleys of said first gear portions; and
   a plurality of rolling members interposed between the crests and valleys of said first and second gear portions for transmitting torque from said first gear portion to said second gear portion, the speed reduction ratio being a function of the relative pitch as defined by the relative number of crests and valleys between said first and second gear portions.

2. A speed reducer according to claim 1, said crests and valleys on said first and second gear portions being of generally sinusoidal configuration circumferentially extending about the axis of rotation of said input shaft.

3. A speed reducer according to claim 1, said rolling members being in the form of balls each having a diameter proportional to the maximum spacing between said first and second gear portions.

4. A speed reducer according to claim 1, including a fixed support plate, a second set of gear members corresponding to said first and second gear members disposed in facing relation to one another between said fixed support plate on one side of said first gear member opposite to said first and second gear members, and rolling members interposed between said second set of gear members, the speed reduction ratio of said assembly being a function of the relative number of crests and valleys and the relative number of rolling members between said first and second set of gear members.

5. A speed reducer according to claim 4, said second set of gear members disposed on a common axis of rotation of that of said first set of gear members.

6. A speed reducer according to claim 5, said second set of gear members having a second gear member mounted in canted relation to said first gear member of said first set of gear members but facing in an opposite axial direction thereto.

7. A speed reducer according to claim 5, the relative pitch of said first and second gear members of each set differing by two.

8. A speed reducer according to claim 5, the number of rolling members in each set being one less than the maximum pitch of each set of said gear members.

9. A differential speed reducer assembly comprising:
a rotatable input shaft having drive means therefor and a circular plate mounted in canted relation to said input shaft to circumscribe a sinusoidal path of movement;
first and second sets of gear members, each set having a first gear member journaled for independent rotation with respect to said plate and having an axially directed cam surface in axially opposed relation to follow the sinusoidal path of movement of said plate each said first gear member being driven by said plate, each said cam surface having uniformly spaced, axially directed crests and valleys of generally sinusoidal form, and each set having a second gear member mounted in axially spaced facing relation to each said first gear member and each said second gear member provided with a cam surface having uniformly spaced, axially directed crests and valleys differing in number from and being in spaced relation to the crests and valleys of said respective first cam surfaces;
a plurality of rolling members interposed between the crests and valleys of said first and second cam surfaces of each said set of gear members for transmitting torque from said input shaft, the speed reduction ratio being a function of the relative pitch as defined by the differing number of crests and valleys between said first and second gear members; and
means constraining said rolling members to undergo a rolling path of movement sinusoidally along the surface of an imaginary sphere whose radius equals the distance between the center of each rolling member and the center of said plate.

10. A speed reducer according to claim 9, said radial crests and valleys being of generally sinusoidal configuration diverging away from the axis of rotation of said input shaft.

11. A speed reducer according to claim 9, said rolling members being in the form of balls having diameters proportional to the maximum spacing between facing gear surfaces of said first and second sets of gear members, and said balls contacting said facing gear surfaces 180° apart throughout their rolling advancement between said facing gear surfaces.

12. A speed reducer according to claim 9, a fixed support ring, said second set of gear members disposed in facing relation to one another between said fixed support ring and one of said first gear members, a rotatable support ring fixed for rotation with an output shaft, said first set of gear members disposed in facing relation to one another between said rotatable support ring and the other of said first gear members, the speed reduction ratio of said assembly being a function of the relative number of crests and valleys.

13. A speed reducer according to claim 9, said circular plate having first gear members of convoluted form.

14. In a speed reducer assembly wherein a rotatable input shaft is provided with drive means, the improvement comprising:
a first cam member journaled on said input shaft to undergo a sinusoidal path of movement, said first cam member being driven by said input shaft at a speed different than said input shaft, said first cam member having axially directed cam portions on one face in the form of circumferentially spaced, axially directed crests and valleys;
a second cam member mounted in axially spaced relation to said first cam member and provided with cam portions having circumferentially spaced, axially directed crests and valleys differing in number from and being in axially spaced relation to the crests and valleys of said first cam portions; and
a plurality of rolling members interposed between said first and second cam portions for transmitting torque from said input shaft to said second cam portions, the number of crests and valleys between said first and second cam portions differing by two.

15. In a speed reducer according to claim 14, said crests and valleys being of generally sinusoidal configuration in a circumferential direction and said valleys, being of arcuate configuration in an axial direction from the axis of rotation of said input shaft.

16. In a speed reducer according to claim 14, said rolling members being in the form of balls each having a diameter proportional to the maximum spacing between said first and second cam portions, the number of balls being one greater than the lesser number of crests on said first and second cam portions.

17. In a speed reducer according to claim 14, including a fixed support plate, a second set of cam members corresponding to said first and second cam members disposed in facing relation to one another between said fixed support plate on one side of said first cam member opposite to said first and second cam members, and rolling members interposed between said second set of cam members, the number of crests between said first and second set of cam members differing by two.

18. In a speed reducer according to claim 17, said second set of cam members disposed on a common axis of rotation to that of said first and second cam members, said second set of cam members having a second cam member mounted in canted relation to said first cam member of said first set of cam members but facing in an opposite axial direction.

19. In a speed reducer according to claim 18, the number of rolling members in each set being one less than the maximum pitch of each set of said cam members.

20. A wobble plate speed reducer assembly comprising:
a casing having opposite end walls;
a rotatable input shaft having drive means therefor, and a wobble member mounted in canted relation to said input shaft to circumscribe a sinusoidal path of movement, said wobble member disposed within said casing;

an output shaft extending through one of said end walls of said casing opposite to said input shaft, and an output plate mounted on said output shaft within said casing in facing relation to said wobble member, said wobble member provided with inner and outer concentric cam surfaces on axially opposed surfaces thereof, said output plate provided with cam surfaces in facing relation to one of said inner and outer concentric cam surfaces of said wobble member, and one of said end walls provided with cam surfaces in facing relation to the other of said inner and outer concentric cam surfaces on said wobble member, said cam surfaces having uniformly spaced, axially directed crests and valleys of generally sinusoidal configuration, the crests and valleys of said inner and outer concentric cam surfaces differing in number from those of said end wall and support plate; and a plurality of rolling members interposed between said inner and outer concentric cam surfaces of said wobble member and said respective cam surfaces of said end wall and support plate for transmitting torque from said input shaft to said output shaft at a speed reduction ratio which is a function of the differing number of crests between said cam surfaces of said end wall, wobble member and output plate.

21. A wobble plate speed reducer assembly according to claim 20, said support plate including inner and outer concentric cam surfaces on axially opposed surfaces thereof, one of said plurality of inner and outer concentric cam surfaces aligned and being in spaced relation to the cam surfaces of said wobble member and the other of said inner and outer concentric cam surfaces on said support plate aligned and being in spaced relation to cam surfaces on an opposite end wall of said casing.

22. A wobble plate speed reducer assembly according to claim 20, said wobble member being in the form of a thin wall plate in which said cam surfaces are formed out of the thickness thereof.

23. A wobble plate speed reducer assembly according to claim 20, said rolling members between respective cam surfaces disposed to undergo a rolling path of movement sinusoidally along the surfaces of different imaginary spheres whose radii equal the distance between the center of each plurality of rolling members and the axis of rotation of said input shaft.

* * * * *